June 23, 1970     P. O. ROBARDS     3,517,187

FREIGHT CAR RETARDING SYSTEM

Filed Jan. 29, 1968     3 Sheets-Sheet 1

*INVENTOR.*
Preston O. Robards
BY
Emory L. Groff Jr.
*ATTORNEY*

United States Patent Office 3,517,187
Patented June 23, 1970

3,517,187
FREIGHT CAR RETARDING SYSTEM
Preston O. Robards, Roselle, Ill., assignor to Portec, Inc., Chicago, Ill., a corporation of Delaware
Filed Jan. 29, 1968, Ser. No. 701,175
Int. Cl. B61l 3/12
U.S. Cl. 246—182                        10 Claims

ABSTRACT OF THE DISCLOSURE

A system for retarding freight cars in hump yards to a predetermined low speed by means of a radiant energy control acting upon a standard car fluid brake system. A solenoid operated valve included in the fluid distribution lines of the brake system is regulated firstly, in response to signals received by a car-mounted receiver from off-car or trackside transmitters when the car is moving above a predetermined speed and secondly, in response to car-mounted speed sensor means when the car is moving below a predetermined speed.

---

The present invention relates to a system for retarding a freight car in hump yards by control of the car by use of radiant energy to operate its own brakes from spaced radiant energy transmitter or emitter devices to retard the car to a predetermined low speed, thereby preventing car or lading damage.

Prior to this invention numerous car retardation devices and systems have been used, namely, track mounted retarders which may be pneumatic or hydraulic.

For example, with pneumatic track mounted retarders, the prevailing practice is to retard cars in two stages immediately after leaving the crest of hump. This form of retarder includes a series of pneumatic squeeze type brakes that grip the rim of each car wheel. These devices have the ability to stop a car completely, but their function is only to retard the car. The amount of retardation is provided automatically by a computer from information assembled from the time the car entered the classification yard. Its destination, classification track, tangent track rolling resistance, car weight, and distance to roll for adequate penetration of its particular track determine the amount of squeeze by the retarders.

Another system of car retardation to control car impact is car mounted, that is, for example, by providing a brakeman to ride the car when rolling free and depending on him to stop the car when needed by using the hand brake on the end of the car. However, this is so unsatisfactory and hazardous as to now be obsolete.

Now even a hump yard with most modern, expensive equipment, such as an electro-pneumatic track mounted retarder, is not free of damage impacts to cars. For example, assuming the weight is known, and the car distance to roll is fed into a computer that in turn applies the correct retardation to allow this car to roll to the extreme end of a newly available track. Usually this works exactly as planned, but exceptions occur because of one or more faults or conditions. For example, the car may have a flat spot on one or more wheels, or a leaky journal box has resulted in oil on the wheel rim prepenting full effectiveness of the clasp retarder, or either a strong head or tail wind exists, or sand on a rail from the previous car. All of these conditions affect the roll ability of the car and none of these factors can be supplied to the computer of a pneumatic retarder as hereinbefore stated. Consequently, a car rolling under any one or combinations of the faulty conditions will not roll to a predicted position. If the car rolls short it is boosted along by the next car assigned to this track by manually circumventing the computer and estimating visually the required speed to properly position cars and damaging impacts occur.

Accordingly, an object of this invention is to provide a novel system to prevent car or lading damage by car retardation, whereby predicting distance to roll is not required as with prior known retarder means.

Another object of this invention is to provide a novel retardation system, whereby a car is allowed to roll as fast as track conditions permit within a predetermined safe speed range to generally accelerate the entire yard operation. For example, a car enters its assigned track and proceeds, until it encounters an active transmitter or emitter, this provides a signal to the receiver means which applies the brake and retards the car to, for example, three miles per hour. Now it is free to roll until its energy is used up or it encounters the track stop near the exit end. Succeeding cars roll to impact under control of the present novel system and coupling always at controlled speeds below three miles per hour. This speed for end impact is known to be not damaging as the most minimum of draft gears absorbs impacts of this nature.

This process continues as cars are progressively rolled to impact, until the first emitter at the first coupling area is deactivated by a car at or near the presence detecting switch of the first emitter. This in turn activates the second or next adjacent emitter and this process continues until the track is filled.

Thus, a further object of this invention is to provide a novel progressive emitter or transmitter arrangement in combination with suitable presence detecting switch means in series circuit connection with the power supply to each respective emitter or transmitter adapted to emit a brake operating signal to the receiver means on a car being controlled on the track.

At the hump crest, or immediately after, a standard form of track type retarder for use to control cars may be provided should the radiant energy system be out of operation or in the event the car is not equipped with the present system of car retardation.

Still another object of this invention is to eliminate the need for expert human control of end impact coupling by the provision of a novel speed sensing means and a solenoid valve means connected by modification of the usual standard fluid pressure brake pipe system and adapted to cut out brake control of the brake system below a predetermined speed and relax the valve means to relieve the brake means of the system to provide low speed free roll of the car to coupling, such speed sensing means and solenoid valve means being initiated and controlled by the receiver of a radiant energy system including a plurality of spaced transmitters or emitters located at predetermined intervals along the track over which the car is rolling.

Yet another object is to superimpose, in combination, directly upon the standard fluid brake systems of freight cars, propagated or radiant energy receiver means and a solenoid air release valve for brake control and speed sensing means operatively associated with the valve solenoid means adapted to become de-activated to release the novel air brake solenoid air release valve at a predetermined low speed of the car, to thereby open said valve to permit brake relaxation only at safe, low, free-roll speed from the relatively level "hump" section of a hump yard for safe end impact coupling of cars on respective inclined sections of switch track to avoid end impact lading damage.

Another object is to provide, in combination, a speed sensor having a low speed cut-out relay and including a car axle mounted generator means adapted to relax the brake operation to a safe predetermined free-roll, end-impact speed of the car, a car mounted energy receiver means electrically connected with the said speed sensor to activate a solenoid valve means interposed in the brake system for brake operation above the safe free-roll impact speed, the receiver on each car being controlled by transmitter means emitting energy to the respective car mounted receivers, each transmitter being mounted in spaced transmitting positions on a center line of each track in the yard switch area, whereby braking of the car on each track is controlled by the transmitted energy to respective receiver means above the low speed cut-out threshold of electrical output voltage of said speed sensor relay, until relaxation of the car brakes by the low speed cut-out relay below the speed threshold of the energy receiver brake control.

With these and other objects in view, the invention consists in the construction, arrangement and combination of parts hereinafter described and particularly pointed out in the claims, it being understood that it is not intended that this invention is to be limited to the details of construction embodied herein.

In the drawings like parts throughout the several views are given like numerals and are thus identified in the following detailed description:

Figure 3:
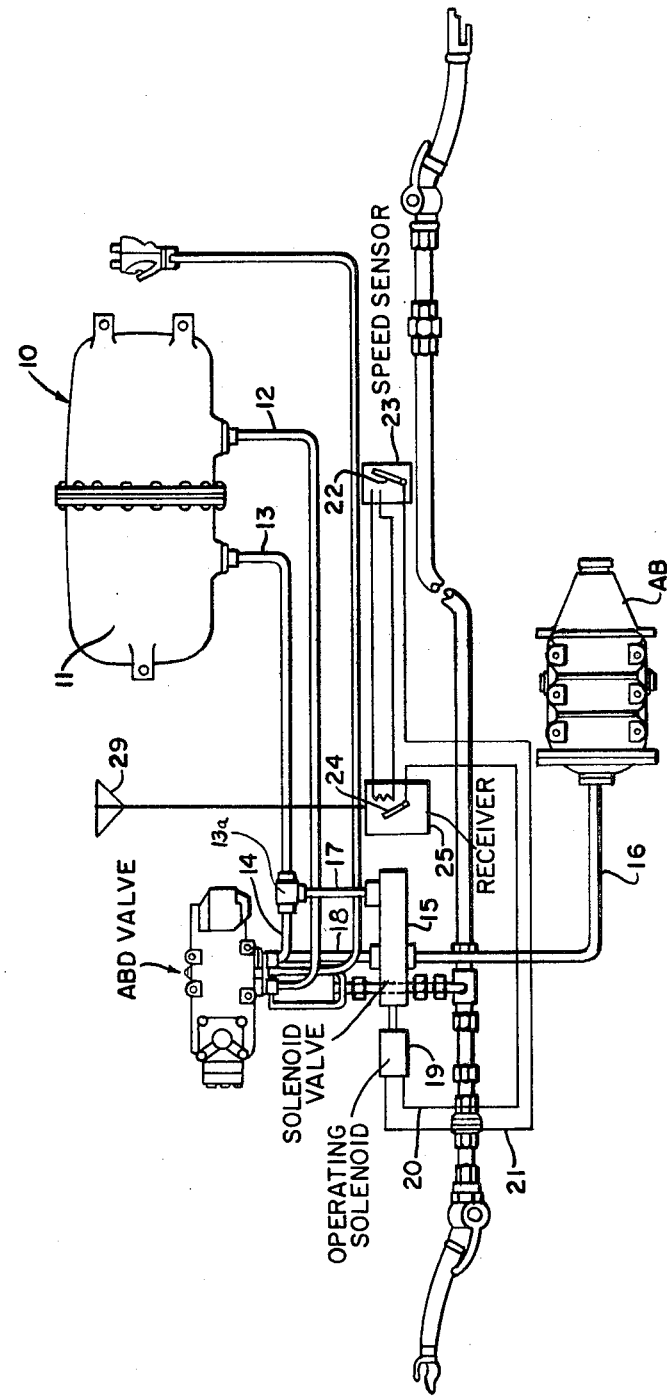
Figure 4:
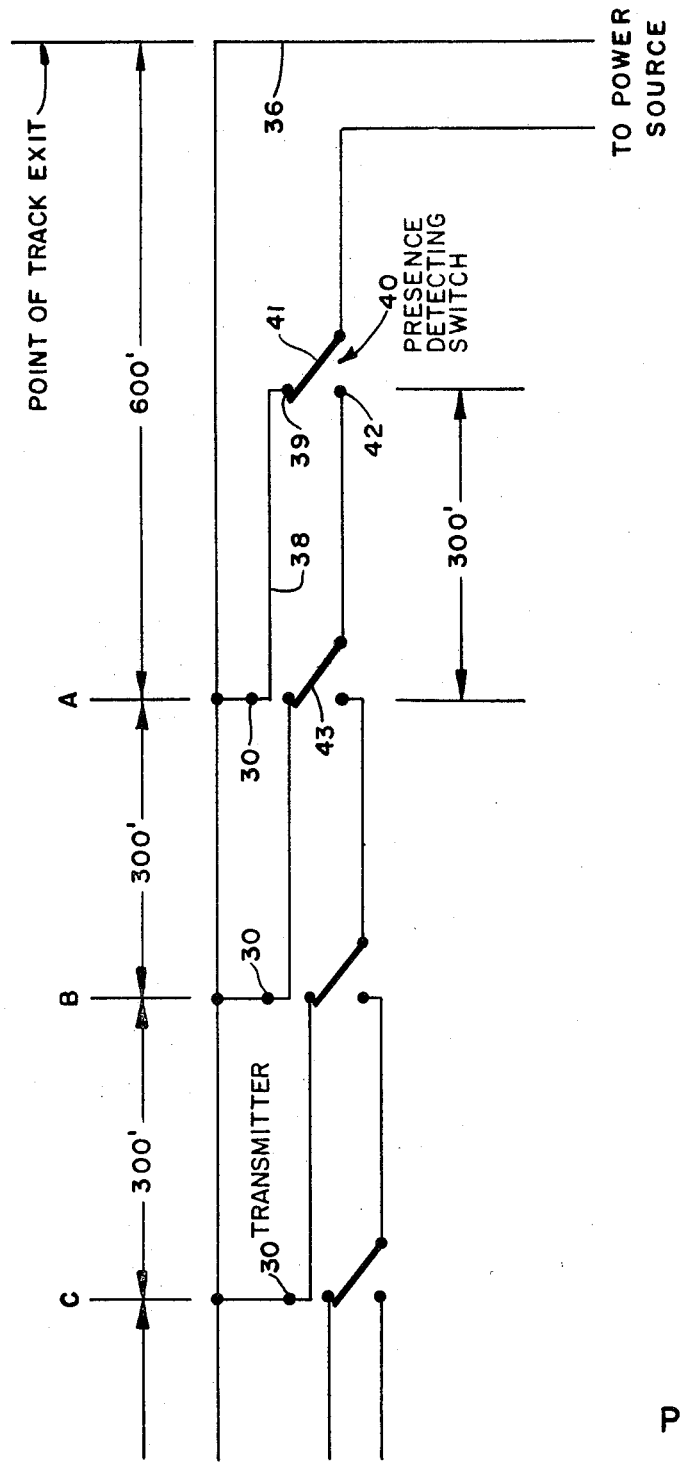

FIG. 3 is a diagram of a standard fluid type freight car brake system showing the connections from the car speed sensor means to the car mounted receiver means and the novel interposed car brake solenoid brake valve means to control the air reservoirs and the air supply to the brake cylinder, and FIG. 4 is a circuit diagram of a single classification track of, for example, 2,000 feet with emitter means at the center and switching means for each emitter connected to a suitable power source.

First, with particular reference to the diagrammatic illustration of FIG. 3, there is shown a standard freight car air brake system including the usual auxiliary and emergency air reservoirs 10 and 11, respectively, with connecting pipe sections 12, 13 and 14 leading therefrom the usual "ABD" valve and from which a line 18 connects through a solenoid valve housing 15 to air line 16 to the standard air brake cylinder AB. The broad use of a solenoid operated valve in a freight car brake system is exemplified in Pat. No. 3,370,166, dated Feb. 20, 1968.

The solenoid valve housing 15 at one end connects to an air line 17 tapped into the reservoir pipe 13 from emergency reservoir 11.

The solenoid valve in housing 15 includes an operating solenoid 19 connected by electric leads 20 and 21 from switch means or relay means, such as low speed cut-out relay 22 of a car speed controlled sensor means 23 adapted to energize said solenoid only above a predetermined speed and cut out below the predetermined speed. The sensor means may be any suitable arrangement, for example, an axle-driven generator and the cut-out relay 22 designed to cut out at, for example, three miles per hour.

The relay means 22 also connects to a switch means or relay means 24 of a suitable radiant energy receiver means, such as a radio receiver means 25, preferably a solid state type receiver not likely to be damaged by impact. This is also electrically connected with the valve solenoid 19 which controls the reservoir means and the air brake cylinders. The receiver may have a radiant energy pick-up, such, for example, as a one-way directional antenna 29, to thereby receive energy from the center of the track and the emitters A, B, C, etc., arranged directly below the car as it rolls to end impact at the track exit end, see FIG. 4. Each emitter should be shielded so as not to influence cars on adjacent tracks.

The speed sensor means 23 may be of any suitable form, for example, as above stated, a car axle mounted generator adapted to generate a voltage of approximately 12 volts or more at over a predetermined speed, for example 3 miles-per-hour or more to maintain the solenoid valve under control of the radiant energy receiver, until the car speed drops below the predetermined speed of, for example, less than 3 miles-per-hour and the relay means 22 cuts out to release air from the brake cylinder means for roll-free motion of the car along the track section under control of first emitter A.

Figure 1:
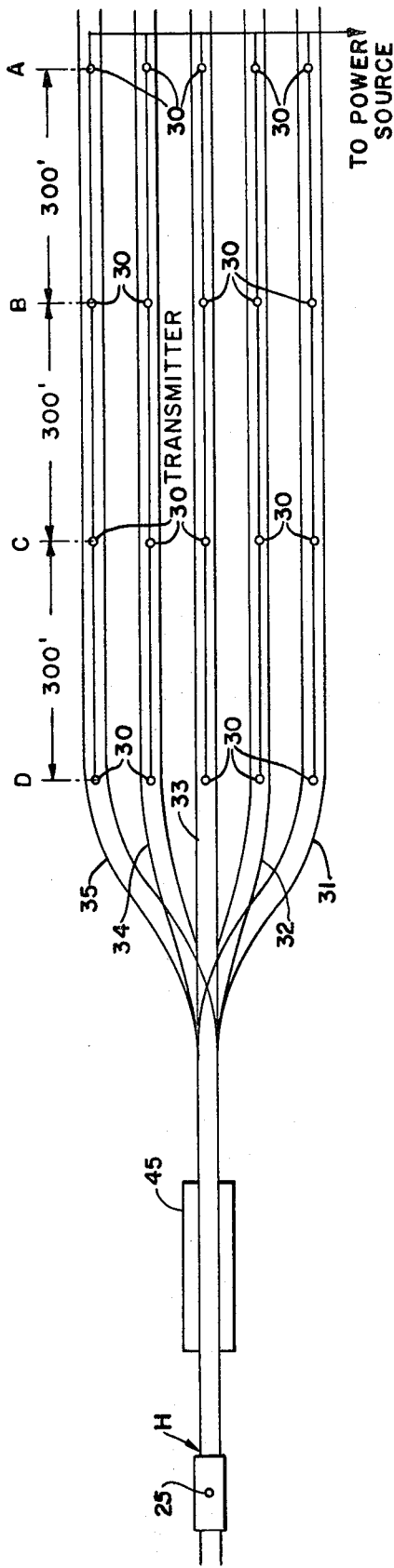
FIG. 1 is representative of a top panoramic view of a hump type switching yard, with a diagrammatic showing of a car with a brake control propagated energy receiver means and with track switch sections having spaced transmitter of energy propagating emitters along each track section to provide car braking to a predetermined low speed.
Figure 2:
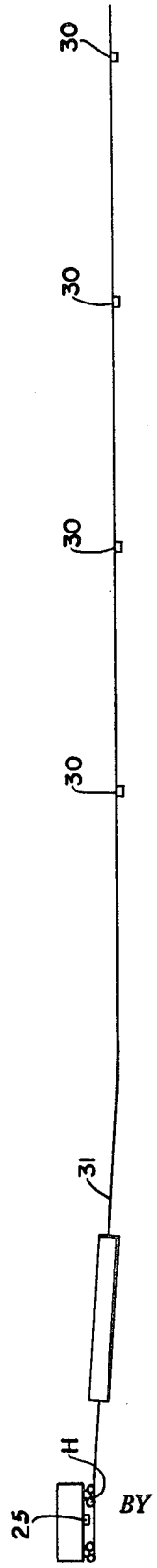
FIG. 2 is a side diagrammatic view to show the relatively level hump portion of the switch yard with the relatively inclined track switch sections down which a car to be end coupled is free rolled when the brakes are released by the speed sensor cut-out means responsive to voltage generator means carried by the car axle and operatively connecting with the receiver means.

Thus, in operation, see FIG. 1, with a car positioned in the substantially level hump section H and both of the emergency and auxiliary air reservoirs under pressure, the radiant energy receiver 25 is controlled from track emitter stations 30 at track sections A, B, C, etc., each suitably spaced along the track sections 31, 32, 33, 34 and 35, see FIGS. 1 and 3, and retards the car wtih its own brakes until it slows, for example, to 3 miles-per-hour and the voltage output of the speed sensor generator means becomes insufficient to activate the sensor switch voltage controlled cut-out relay means 22 designed to cut out at or less than 3 miles-per-hour, whereby the radiant energy receiver likewise becomes inactive and the solenoid valve is relaxed to exhaust air from the brake cylinder allowing the car to roll free into end impact with another car or string of cars on the track.

Further in reference to FIG. 3, is is believed clear that the standard air pipe arrangement 13 was originally one continuous line in the usual standard car brake system. However, with the present invention the line 13 is modified as shown to provide a line 13 from the emergency reservoir 11 to a coupling 13a and a line 14 to the ABD valve of the car brake system.

Thus, assume a car brake system modified by the inclusion of the solenoid valve 15, the speed sensor 23 and the activating radiant energy receiver 25 has just entered the track 33, FIG. 1, at a speed in excess of 3 miles-per-hour, speed sensor 23 has energized relay 22, thereby activating radio receiver means 25. In this condition the car passing over an active emitter 30 permits the electrical energy of speed sensor 23 to activate solenoid 19 of valve 15.

when the solenoid 19 is activated air in emergency reservoir 11 traverses pipe 13 to the coupling 13a and to pipe 17 through valve 15 to air line 16 to brake cylinder AB applying the car brakes, until the car slows down to 3 miles-per-hour. At such time, the axle generator or speed sensor 23 is not producing wattage sufficient to keep relay 22 closed. This condition of the relay deactivates the radiant energy receiver 25 and the solenoid 19 and the brake system is then in the operative condition it was prior to the installation of the novel components of the present system, that is, the ABD valve has air supplied by pipes 13 and 14 and will dispense through pipe 18, valve 15 and pipe 16 as required. Thus, when solenoid 19 is not activated there is an opening or flow connection between pipes 18 and 16 and a closure between pipes 17 and 16.

With reference to the emitters or transmitters A, B and C, spaced centrally along a respective track section, each emitter is connected to a suitable power source as indicated in FIG. 4. One side of the power line 36 is series connected to the emitter means, which may be spaced along the track at, for example, three-hundred feet and the other side of the power line 37 connects to a switch arm 41 through an auxiliary lead 38 to the first emitter A. The switch arm connects to one contact 39 of a switch device 40 to energize the first emitter, until this emitter is cut off by the stationary presence of a previous car, causing deactivation of the emitter A by the switch arm being positioned to engage another contact 42 of the switch. This then activates the second emitter at B which progressively controls succeeding cars as they roll to impact and coupling control emitter 30 at B is deactivated by a car at or near the presence detecting switch 43. This emitter and switch arrangement progressively continues until the track is filled.

As shown in FIG. 1, schematically, there is included a track-mounted retarder 45 of the electro-pneumatic or hydraulic type to be used when cars not equipped with the present radiant energy control system are to be rolled to end impact position on the track. Such forms of retarders are well known and are explained above.

Without further description it is believed that the present novel system and the elements herein described, and their respective and cooperative functions and organization, are sufficiently clear to be understood by others skilled in the art. However, it is to be expressly understood that this description and disclosure is for example only and is not intended as a limitation in specific structural features and reference is to be had to the appended claims to determine the scope of the invention.

What is claimed is:

1. A freight car mounted upon a track and having a brake system of standard type, including a brake control combination for use in hump switch yards for safe end impact comprising a solenoid controlled brake valve attachment providing for automatic control of said system at a predetermined car speed, a radiant energy system including a controlled section of said track having radiant energy transmitter means disposed adjacent a section of said track in an off-car location to control the freight car brake system, a car mounted radiant energy receiver means responsive to said off-car transmitter means, and a speed sensor means for maintaining operation of said radiant energy system above said predetermined car speed, said sensor means including cut-out relay means adapted to cut out and pre-empt said radiant energy system and deactivate said solenoid controlled brake valve below said predetermined speed to relax said brake system to provide free roll of cars in the hump switch yard for safe end impact car coupling.

2. A freight car brake system according to claim 1, wherein said speed sensor means is a car axle driven generator with an output voltage controlled according to car speed and ineffective to operate the said cut-out relay means of said sensing means at speeds below said predetermined speed.

3. A freight car brake system according to claim 2, wherein said predetermined speed is approximately three miles-per-hour.

4. A freight car brake system according to claim 1 wherein said radiant energy receiver means is a solid state radio receiver and includes a one-way directional antenna adapted to pick up radiant energy propagated from said transmitter means in a direction opposed to car travel toward end impact coupling.

5. A freight car brake system according to claim 1 wherein said transmitter means includes a plurality of transmitters spaced linearly along the hump yard switch track section in series connection with a power source, and switching relay means are provided along said track section for progressively energizing said transmitters.

6. A freight car mounted upon a track and having a fluid brake system of standard type including a control system for attachment to said brake system, a solenoid valve attachment interposed in the system, providing for automatic control of said system at a predetermined speed condition and for automatic relaxing of said brake system below said predetermined speed condition, a radiant energy system including off-car transmitter means disposed adjacent a section of said track and on-car receiving means controlling said valve attachment above said predetermined speed condition, a voltage generating system electrically connected to said solenoid valve attachment and responsive to said predetermined speed condition, whereby said solenoid brake valve attachment is operated according to voltage output of said generating system.

7. A freight car brake system according to claim 6, wherein said solenoid valve attachment includes a solenoid with a winding responsive only to output voltage from said generating system when the speed of said car is above a predetermined speed threshold to maintain operation of said radiant energy control system, and wherein said generating system includes a normally energized relay in circuit with said solenoid winding, non-responsive to output voltage from said generating system below said predetermined speed threshold to permit said valve to open and exhaust the fluid brake system and relax the brake system to permit free roll of the said car.

8. A freight car mounted upon a track and having a brake system of standard type having the usual air reservoir means and air lines to an air brake cylinder, a solenoid valve means connected in the said air lines of the system for control of said reservoir means and brake cylinder, radiant energy means providing release of air from said reservoir means to the brake cylinder to thereby apply the brakes of the system at a predetermined slow speed, said radiant energy means including of-car transmitter means disposed adjacent a section of said track, and voltage responsive relay means adapted to cut out to deactivate said solenoid valve means at a predetermined relatively low speed to release air from said brake cylinder, whereby the car rolls free until impact and reconverts the car brake system to its standard condition.

9. A freight car brake system according to claim 8, wherein the voltage responsive cut-out relay means is an axle mounted generator with a relay designed to cut out at a predetermined safe speed to permit free roll of a car to end impact.

10. A freight car mounted upon a track and including a retarding system comprising, in combination with a standard freight car brake system, a solenoid brake valve attachment to the associated reservoir means of the system and connected to the brake means of the car by modified pipe connections, a radiant energy system having on-car receiving means to operate the car brake means by control of said solenoid brake valve attachment, said radiant energy system including a plurality of series connected off-car radiant energy emitters disposed adjacent a section of said track with switching means connected to each emitter and responsive to remote switch operating means to progressively activate said energy emitters to activate said receiver means and control retardation of the car.

References Cited

UNITED STATES PATENTS

| 3,384,744 | 5/1968 | Watanabee et al. | 246—182 |
| 3,370,166 | 2/1968 | DaRold et al. | 246—182 |
| 3,385,964 | 5/1968 | Clejan et al. | 246—182 |

ARTHUR L. LaPOINT, Primary Examiner

G. H. LIBMAN, Assistant Examiner

U.S. Cl. X.R.

104—26; 246—187